Figure 3:
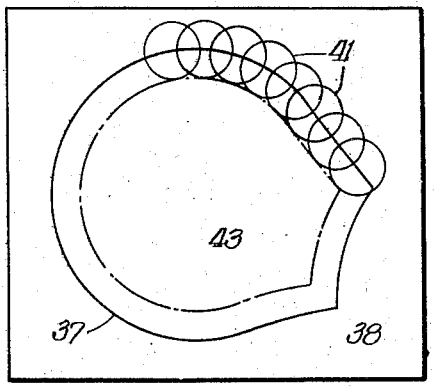

Aug. 19, 1941.  H. E. GOLBER  2,253,270
GEAR
Filed June 7, 1939    2 Sheets-Sheet 1
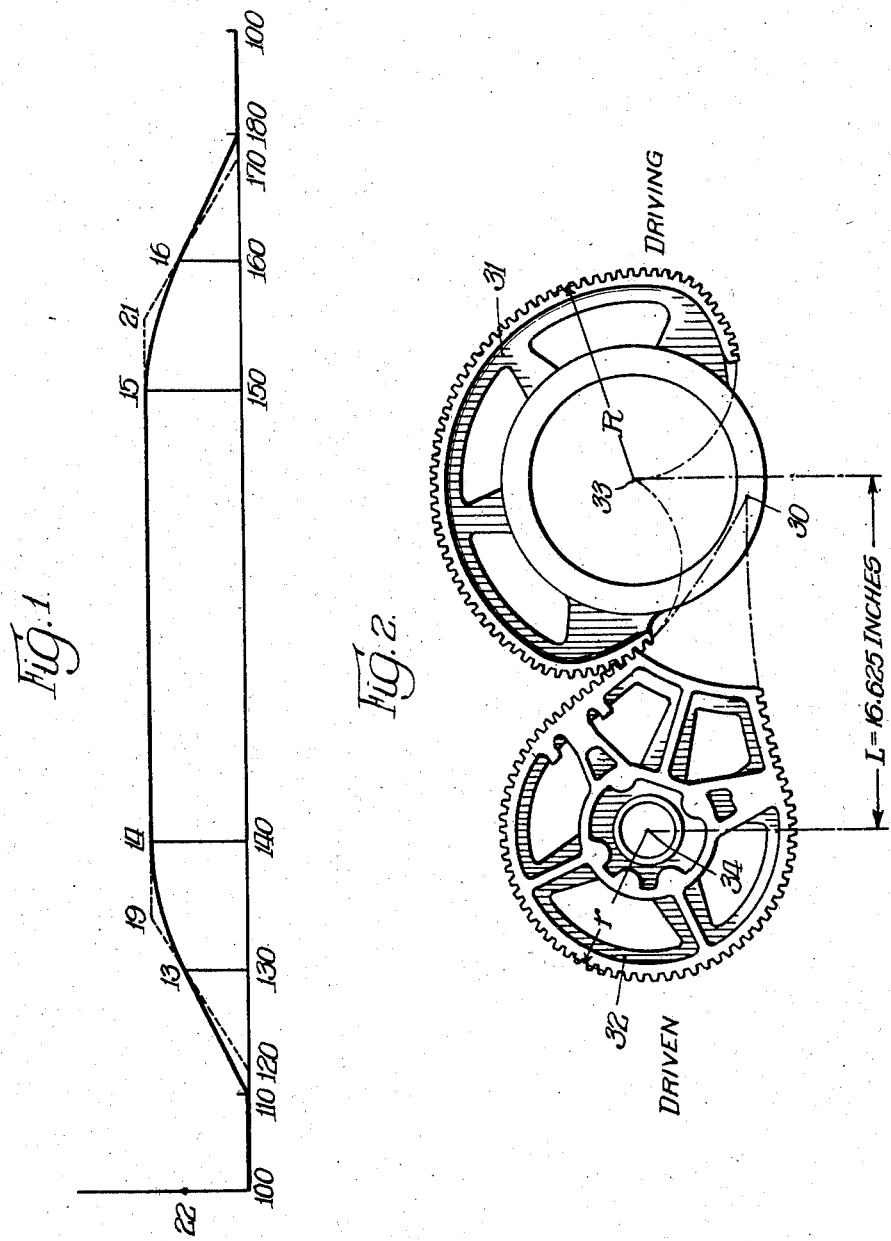
INVENTOR.
Hyman E. Golber,
BY
ATTORNEY.

Patented Aug. 19, 1941

2,253,270

UNITED STATES PATENT OFFICE 2,253,270

GEAR

Hyman E. Golber, Chicago, Ill., assignor to Miehle Printing Press and Manufacturing Company, Chicago, Ill., a corporation of Illinois Application June 7, 1939, Serial No. 277,858

14 Claims. (Cl. 74—437)

My present invention pertains to certain improvements and betterments in companion or complementary, roll-curve gears, and it concerns more particularly pairs of intermeshing gears which provide a non-uniform or varying rotation, at least in part, of the driven gear of the couple.

One aim of the invention is to supply gears capable of affording movements of mechanical elements which heretofore have been impossible or impractical to make, and, by reason of this invention, the motions capable of production are now of the greatest variety.

Another object of the invention is the supplying of gears of this character which are free from cusps and which have all of their teeth in a single plane, or at least in operative register.

A further purpose of the invention is the making of roll-curve gears which will give the least degree of shock to the parts involved, even though the driven-gear and its associated mechanical-elements are operated at variable speeds.

In automatic machinery, the movements of the various parts thereof are usually obtained from the motion of a follower impelled or actuated by a driver, the latter ordinarily rotating at a uniform speed, the follower having some definite motion, usually one of rotation. When the follower motion is a rotation at uniform speed, the driver and follower are customarily connected by ordinary circular gears; when the follower motion is a rotation of non-uniform speed, irregular-shaped gears are sometimes used; and when the follower moves in a more complicated manner, various kinds of devices, such as cams, planetary-gears, levers, or sundry combinations thereof are used. Frequently, the designer of the machine is unacquainted with any means which will produce the required follower motion, and, therefore, he is compelled to resort to an undesired motion which he knows how to produce.

Accordingly, the outstanding problem to be solved by the present invention was the production of gears of such characteristics as to make it possible to give to the follower or driven-gear practically any desired motion, and the novel features of this invention enables a designer to effect the follower motion wanted, and, consequently, to obtain the most excellent condition in the machine which he is devising.

Stated in a general way, the production of the gears incorporating the instant invention involves (a) the development of a "speedgraph" of the follower or driven-gear from data of the required, at least in part, non-uniform motion, (b) the development of roll-curves for both the driving and driven gears, (c) the making of master-patterns in accordance with such roll-curves, and (d) the production of the novel driving and driven gears under the control of such dominant patterns or cams.

The invention can best be understood by reference to the illustrations in the accompanying drawings in which—

Figure 4:
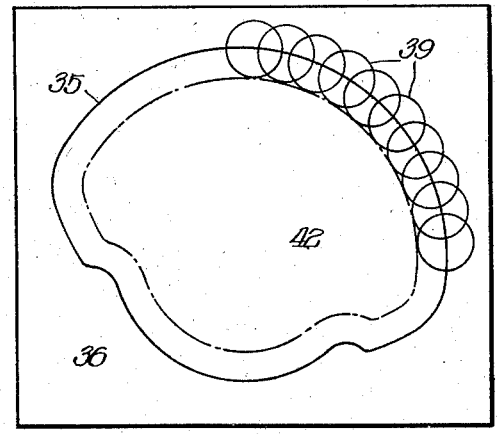
Figure 5:
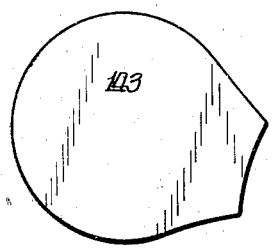
Figure 6:
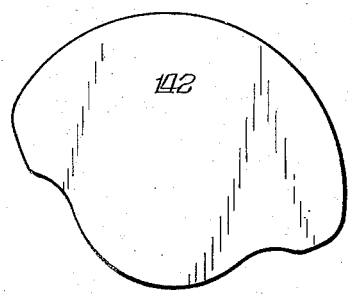
Figure 7:
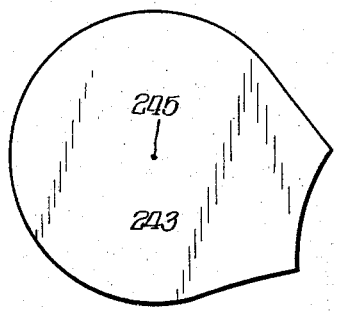
Figure 8:
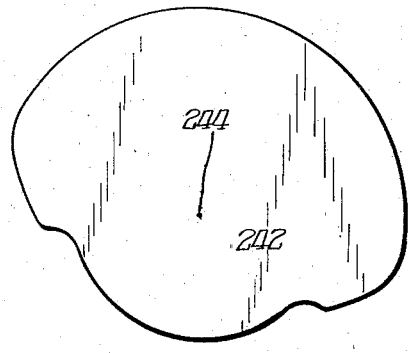

Figure 1 illustrates an original and a modified so-called speedgraph;

Figure 2 portrays the pair of roll-curve gears produced;

Figure 3 shows the method of making the first, reduced-size master-cam for the driven-gear;

Figure 4 presents the same for the driving-gear;

Figure 5 depicts the complete, first master-cam for the driven-gear;

Figure 6 pictures the same for the driving-gear;

Figure 7 discloses the second, full-size, roll-curve master-cam for the driven-gear; and Figure 8 sets forth the same for the driving-gear.

It is to be understood, of course, that in presenting an example of how the invention may be put into commercial practice, no statement contained therein should be deemed as constituting any limitation on the scope of the invention as defined by the appended claims.

To facilitate an understanding of this invention and to indicate the differences between more or less related terms, the following definitions should be kept in mind: acceleration is the rate of increase of speed, deceleration is the rate of decrease of speed, displacement is the change of position with the element of time omitted, speed is the rate of change of displacement, and impulse is the rate of change of acceleration or deceleration. The term parabolic means a particular kind of non-uniformity where the change is according to the square of the time.

Let it be assumed that the problem to be solved is the production of a pair of correlated driving and driven spur-gears of which the former is to rotate at a uniform speed and the latter is to revolve at a speed which, for a portion of the time at least, is variable in order to produce required non-uniform movements.

Accordingly, using a rectilinear-system of coordinates, a speedgraph line is drawn representing the needed speed characteristics of the driven-gear to be provided, and in Figure 1 such a line is shown partly in full line and partly dotted.

In such Figure 1, the horizontal base-line 100—110—120—130—140—150—160—170—180—100 represents zero speed, distances above such base-line delineating follower or driven gear rotation in the opposite direction to that of the driving-gear and distances below such base-line denoting driven-gear rotation in the same direction as that of the driving-gear.

Line 100—120—19—14—15—21—170—100 depicts the required speed rotation of the follower or driven gear to be supplied, the line 170—100—120 portraying a period of dwell or non-rotation of the follower-gear, the two ends of the line characterized 100, 100 representing the same single point; that is to say, the follower does not rotate for the period represented by the space 170—100—120.

That straight portion 120—19 of the line indicates a uniform acceleration of rotation of the follower-gear, in other words, a parabolic angular-displacement of the gear around its axis; that horizontal part 19—21 of the line designates a uniform rotation of the follower or driven gear at the highest speed reached at the end of the acceleration; and that straight section 21—170 of the line depicts a uniform deceleration or parabolic decrease of angular-displacement of the rotating follower-gear.

In drawing such a speedgraph, any unit of length is arbitrarily chosen to represent the known uniform rotational speed of the driving-gear, and the vertical speed-ordinates of the follower-gear line of the speedgraph are of lengths based upon such unit of length, the latter being shown in Figure 1 as line 100—22.

It is to be particularly noted that in this speedgraph the periods of parabolic angular-displacement of the driven-gear are not denoted by curved or parabolic lines, but rather by straight inclined or sloping lines 120—19 and 21—170 indicative of uniform change of speed.

The point 19, therefore, depicts a sudden termination of the constant substantial acceleration of the follower-gear and an abrupt institution of its uniform speed of rotation, which more or less violent transition, if it were allowed to occur, would create a shock in the mechanism with resulting detrimental effect, especially in a machine requiring great accuracy in the movements of its parts, as, for example, in a printing-press where registration of printing or positioning of sheets of paper are of prime importance.

The point 21 represents a similar but reverse shock-creating condition, that is to say, the quick ending of its uniform-speed revolution and the instant establishment of its period of its uniform deceleration at a material rate.

It is to be understood further that the area beneath the line 120—19, or 19—21, or 21—170 represents the angular-displacement of the follower-gear, and this, of course, is true of any portions of such lines, the total area 120—19—21—170—120 corresponding to 360 degrees of rotation of the follower-gear.

To avoid such abrupt or quick changes of rotation of the follower or driven gear, portrayed by the cusps at 19 and 21, it becomes desirable or necessary to eliminate these cusps by the substitution of curves therefor, but, inasmuch as the areas below such curves must be dealt with in the development of the roll-curve for the driven-gear, it is of great importance that the curves chosen shall be such as (a) to facilitate or even make possible the ready ascertainment of the whole or partial area below the complete curve or section thereof, and (b) to be consonant or compatible with the functioning capacity of available gear-tooth cutting-machines.

I have discovered that the best curve to employ for this purpose, and for the accomplishment of the above-stated and other objects, is a parabola with its axis at right-angles to the horizontal base-line, such curve providing a constant rotational impulse to the follower-gear.

Such parabola should be preferably relatively large, rather than small, in order to afford smooth action of the gears, and to aid in the cutting of the gear-teeth, and it may be readily computed and drawn, requiring no reference to trigonometric tables.

The parabola so selected may depend somewhat upon the desired requirements in the finished machine, bearing in mind that the companion driving-gear must cooperate with the final follower or driven gear at these points, and remembering the facilities available for cutting the gear-teeth, etc., but no difficulty will be experienced by one skilled in the art in providing such cusp-eliminating parabolas.

The parabola so employed will, in each instance, be tangent to both of the lines which it connects, thus assuring no drastic or undue changes of acceleration of the follower-gear.

In Figure 1 the speedgraph has been modified to indicate the employment of parts of two suitable parabolas to remove the cusps referred to, and, in such figure, the parabolic lines 13—14 and 15—16 have been introduced to take the place of the upper portions of the lines 120—19 and 21—170 and the opposite end portions of the line 19—21.

In the final speedgraph chart, it is to be remembered that the ordinates of the curve represent speed, the area beneath the curve angular-displacement, and the grades of the curve acceleration or deceleration, as the case may be.

From this new altered speedgraph curve or line 100—110—13—14—15—16—180—100, and in which the ordinates 14—140 and 15—150 represent the axes of the two parabolas, it will be seen that the constant acceleration or parabolic angular-displacement, indicated by the straight, sloping line 110—13, is gradually and smoothly modified, as represented by the parabolic line 13—14, so that, although acceleration continues from 13 to 14, it is no longer constant but rather decreasing and of a type having no known name, and, at the point 14, such acceleration becomes zero and the motion of the follower-gear transformed into a uniform speed represented by the line 14—15.

Again, such uniform rotational speed of the driven or follower gear is ended at the point 15 and deceleration thereof instituted gradually and smoothly and then more or less rapidly increased, as represented by the parabola section 15—16, and at the point 16, such deceleration becomes and continues constant and unvarying until the beginning of the dwell at the point 180.

It should be observed that at each of the points 13, 14, 15 and 16 the parabolas are tangent to the lines 110—13, 14—15, 15—14 and 16—180, respectively.

Just how such parabolas shall be employed to cut off the cusps in the speedgraph may depend upon any one of several factors.

In the present case let us assume that the length of the uniform speed line 19—21 is not absolutely essential to obtain the required operation of the parts actuated by the driven or follower gear and that the rapidity of acceleration and deceleration, as represented by the lines 120—19 and 21—170, may be slightly changed without interfering with the successful operation of the machine.

To produce this result, the section of the parabola 13—14 is introduced into the speedgraph with the vertex of the parabola at the point 14, and the slope of line 120—19 is decreased slightly, so that the parabola is tangent to the line 14—15 and also tangent to the new line 110—13, the inclination of line 120—19 having been changed just enough so that the area 110—13—14—140—130—110, representing angular-displacement of the driven-gear, in the final speedgraph, is exactly the same as the original area 120—19—14—140—130—120.

As is fully shown, this change of inclination is brought about by shifting the intersection of line 19—120 with the base-line at the point 120 slightly to the left to point 110 and terminating the new straight inclined line at the point 13.

As will be readily understood, another section of parabola 15—16 is similarly introduced into the diagram to eradicate the cusp at 21.

If it were essential to maintain the length of line 19—21 to secure a predetermined period of constant speed of the driven-gear and it were permissible to change the period of, or rate of, acceleration and deceleration, the lines 120—19 and 21—170 would be correspondingly modified to permit the introduction of the parabolas.

Or, in some cases, the length of the area 14—15—150—140 under the new curve or line may be increased in very minor degree to keep the total area under the follower-gear curve the same as in the original speedgraph.

One acquainted with, and skilled in, this art will encounter no substantial difficulties in removing the cusps by the adoption and introduction of the parabolas and at the same time preserving the required irregular rotation of the follower-gear to be produced.

In every instance, the parabola employed has its axis vertical, that is at right-angles to the base-line, to facilitate mathematical calculation, rather than resorting to complicated formulae or trigonometric tables.

Actually, in this speedgraph chart of Figure 1, the total angular-displacement of the driving-gear should be represented by the area of a rectangle having a length represented by the full length of the base-line 100—100 and having a height 100—22, but, inasmuch as the base-line itself can be conveniently used for such representation, because its various sections are directly proportional to the corresponding areas, it is hereinafter so employed.

Accordingly, the several portions of the horizontal base-line, the total length of which corresponds to the 360 degrees of uniform rotation of the driving-gear of the pair, represent as follows in this particular example:

100—110 = 29.6388885 degrees
110—130 = 40.0000000 degrees
130—140 = 40.0000000 degrees
140—150 = 140.7222230 degrees
150—160 = 40.0000000 degrees
160—180 = 40.0000000 degrees
180—100 = 29.6388885 degrees The illustrated vertical ordinates of the follower-gear curve of Figure 1 are as follows and their values show their proportion of the unit-speed ordinate 100—22 of the driving-gear:

130—13 = 1.00628931
140—14 = 1.50943396
150—15 = 1.50943396
160—16 = 1.00628931

As the line portion 180—100—110 is a dwell for the driven-gear, point 30 (Figure 2) on the dotted extension of the roll-curve of the latter would have to be kept at the driving-gear axis, and this would be quite unsatisfactory for several reasons. Therefore, the dwell part is mechanized, not by roll-curve gears, but by cams and roller arms.

Moreover, the gear portions on line 110—13 near the point 110 and on line 16—180 near the point 180 are not satisfactory because the gears would unmesh, and so the cam-and-roller drive is made to provide also for the disadvantageous lower portions only of lines 110—13 and 16—180.

It has been indicated previously that the cusps are to be removed from the speedgraph and yet two remain at 110 and 180, these two occurring, not on the gear-portion, but on the cam-portion, as just stated above, when the follower-gear speed is very low; yet in some speedgraphs even the speed-zero cusps are rounded out.

The manner in which such cams and rollers may be employed for the specified purpose is fully presented in my United States Patent 2,027,818, Drive-mechanism, granted January 14, 1936 and need not be referred to here further.

Now for each degree of turn of the driving-gear beginning at zero at the point 100 (left-hand end of the line), for each corresponding ordinate of the follower-gear curve 100—110—13—14—15—16—180—100, the total area beneath such curve to the left of such ordinate represents the total amount of angular displacement or turn of the driven-gear. In mathematically determining such areas under each parabola, one starts with the axis (14—140 or 15—150) of the parabola and works backwardly for the parabola 13—14 and forwardly for the parabola 15—16 as otherwise the computation would perhaps be unduly complex.

For example, the driven-gear does not begin to rotate until the driving-gear has turned 29.6388883 degrees corresponding to the point 110, and, while the driving-gear revolves the next 40 degrees, as represented by that portion of the base-line 110—130, the driven-gear must rotate an amount corresponding to the area 110—13—130 which is determined in this manner:

Area 110—13—130 = ½ × (110—130) × (130—13)
Area 110—13—130 = ½ × 40 degrees × 1.00628931
Area 110—13—130 = 20.1257862 degrees In this connection it must be appreciated that, although the length of line 110—13 is greater than the length of the line 110—130, nevertheless the driven-gear is rotated a lesser amount during the rotation of the driving-gear than that of such driving-gear, this being due to the fact that whereas the length of line 110—130, as we are now considering it, represents the extent of rotation of the driving-gear, the area beneath line 110—13 represents the rotation of the driven-gear during the same period.

If, however, we were comparing the actual area of the driving-gear rectangle having a base 110—130 and a height 100—22 with that of the driven-gear triangle 110—130—13 the relative angular-displacements of the two gears during the same period of time would be more obvious.

The line 130—140 depicts a turning of the driving-gear of 40 degrees, and, during such rotation thereof, the driven-gear will be revolved an amount corresponding to the area 130—13—

14—140, which is computed in known manner thus:

Area 130—13—14—140 =
⅓ × (130—140) × ((130—13) + 2(140—14))
Area 130—13—14—140 =
⅓ × 40 degrees × (1.00628931 + 2(1.50943396))
Area 130—13—14—140 = 53.66876305 degrees Further, while the driving-gear turns the next 140.7222230 degrees, represented by the line 140—150, the driven-gear will be rotated 212.4109023 degrees in accordance with the rectangular area 140—14—15—150.

When the driving-gear rotates the succeeding 40 degrees, in correspondence with line 150—160, the driven or follower gear revolves 53.66876305 degrees, and, while the driving-gear thereafter turns 29.6388885 degrees, denoted by line 160—180, the companion driven-gear turns 20.1257862 degrees.

By this time, the driven-gear has completed its single 360 degree revolution, and it dwells or remains stationary during the period the driving-gear turns two times 29.6388885 degrees, that is 59.2777770 degrees, represented by the combined lines 180—100—110.

As will be readily understood, the area beneath the straight sloping line 110—13 represents a uniform acceleration of the driven-gear, the area beneath the section 13—14 of the vertical parabola corresponds to a constant impulse resulting in a graduated reduction of the acceleration, whereby the rotation of the driven-gear reaches a uniform or unvarying speed at the point 14, which condition persists, as represented by the rectangle 140—14—15—150, until point 15 is reached, whereupon the speed of the driven-gear is decelerated at a gradually increasing rate which, at the point 16 becomes a uniform deceleration until point 180 is reached, where such deceleration has brought the driven-gear to a standstill.

Machines are assumed to be built of rigid material, as for example, cast-iron, but, of course, in reality there is no such thing as an absolutely rigid material, that is every body bends in some degree when forces are applied to it, the amount of bending being proportional to the stress to which it is subjected.

Since in a machine, the inertia forces are proportional to the square of the machine-speed, such bends of its parts created by such forces are proportional to the square of the machine-speed times acceleration.

At every speedgraph cusp, the bodies would have two different bendings corresponding to the different grades of the lines meeting at the cusp, and, since it frequently happens that the bodies are considerably resilient, they would bend sufficiently to cause misplacement of the parts, and, at high speed, would "knock" and result in defective operation of the mechanism.

Such troubles are eliminated by the practice of the present invention based on the removal or avoidance of cusps in the speedgraph curve.

The following table may be of assistance in analyzing what happens to the driven-gear at different parts of the speedgraph-chart:

In Figure 2, the driving-gear 31 and its attendant or mating follower or driven gear 32 are shown in meshed relation, in this particular or specific example with a fixed distance of 16.625 inches between their axes 33 and 34 respectively, about which they are designed to revolve.

We will now consider the manner in which such pair of gears is produced from the speedgraph of Figure 1.

For each degree of rotation of the driving-gear, as indicated by the line 100—108, the corresponding amount of turning of the driven-gear is determined mathematically in the same general manner as indicated above for the particular points 110, 130, 140, 150, 160, 180, so that for each added degree of turning of the driving-gear, from its starting point, the total amount of turning of the driven-gear will be known.

It can be readily demonstrated that with these roll-curve gears, the ray (not radius) (R for the driving-gear and r for the driven-gear) from the axis of the gear around which it revolves to its roll-curve at any point of the latter is for the driving-gear represented as follows:

R = constant distance between the axes of rotation of the two gears (L = in this case 16.625 inches) multiplied by the speedgraph ordinate (S) corresponding to the angle or the ray and such product divided by 1 (one) plus the same speedgraph ordinate (S) and the equation may be written thus:

$$R = \frac{LS}{1+S}$$

and similarly the equation for the ray of the driven or follower gear may be expressed thus:

$$r = \frac{L}{1+S}$$

The roll-curve for the driving-gear may be plotted on a sheet of paper by drawing 360 rays from a common center one degree apart and marking on each such ray line the proper length thereof as determined by the above-noted formula, and then by drawing a line through all of these points, such line will represent the roll-curve for the driving-gear.

Instead, however, of thus plotting such roll-curve by drawing the diverging rays from a common center one degree apart, the many successive points defining the roll-curve may be plotted by means of a system of rectilinear-coordinates.

The driven-gear roll-curve may be plotted in similar manner by drawing the 360 radiating rays equally spaced and marking thereon the points determined by the formula stated above, or the rays may vary as to the degrees or angle between them as determined for each degree of turning of the driving-gear and the marks applied to such rays.

In either case, a line drawn through the successive marks or points results in the driven-gear roll-curve.

Instead of using rays for the location of such roll-curve points, a system of rectilinear-coordinates may be resorted to.

| Speedgraph | Displacement | Speed | Acceleration | Impulse |
|---|---|---|---|---|
| Horizontal zero line | 0 | 0 | 0 | 0. |
| Horizontal upper line | Changes at uniform rate. | Remains constant | 0 | 0. |
| Oblique straight lines | Parabolic | Changes at uniform rate. | Remains constant | 0. |
| Parabolas | Cubic | Parabolic | Changes at uniform rate. | Remains constant. |

Such driving-gear roll-curve 35 (Fig. 4) may be originally plotted and drawn on the plane face of a flat metal plate 36 of suitable thickness, or may be transferred thereto from the curve plotted on paper, and, in like manner, the driven-gear roll-curve 37 (Fig. 3) may be plotted on another suitable blank plate 38.

Each such plate then has its center portion cut out by providing a series of overlapping holes through the plate by a rotary-cutter, the axis or center of which in each cutting operation is in register with the corresponding roll-curve, and, a hole is thus cut through the plate for each of the equally-spaced (one degree) rays of the driving-gear roll-curve and for each of the rays for the roll-curve of the driven-gear.

Some only of such holes 39 are shown for the driving-gear and these are not spaced as close to one another as in actual practice, corresponding holes 41 being used in the other plate 38.

After all of these holes have been cut, we have a crude first master-cam 42 for the driving-gear and a similar first master-cam 43 for the driven-gear, each cam being smaller all around by the radius of the cutter than the corresponding roll-curve, all as is clearly shown.

To preclude any relative movement of each such cam and the blank from which it is being cut in the manner indicated, the blank should initially be fastened fixedly at several points to a sustaining or supporting plate or member whereby each cam 42 or 43 is immovable with relation to its blank 36 or 38 during the entire cam producing operation.

In some cases, it is preferable to cast or otherwise provide a blank of substantially the shape of the cam to be made but slightly larger than the cam, and, instead of actually boring holes through a blank, using the same cutter in the same way, except that the rotary-cutter during its successive longitudinal movements removes only a relatively small amount of metal from the periphery of the blank.

Owing to the slight spacing between the holes or cuttings of the two groups or series, each such cam 42, 43 will have minor transverse ribs or ridges on its edge and these are very carefully removed by filing or grinding, thus providing the final first master-cams 142 and 143.

By using these first master-cams with rollers traveling on their edges and with suitable mechanically-associated cutters, the positions of which are controlled by the shapes of such first cams, and by means well understood by any machinist, second full-size roll-curve master-cams 242 and 243 are provided and these have peripheries exactly like the corresponding roll-curves 35 and 37.

The reason why such final full-size cams 242 and 243 cannot be made direct by the method of producing the first cams 142, 143 is that the rays of the roll-curves are not always normal to the curves.

As a matter of fact, while it is ordinarily desirable to do so, it is not essential and imperative that the roll-curves 35 and 37 be produced, either on paper or on the metal blanks from which the first master-cams are made, but rather the successive points for the location of the center or axis of the cutter may be selected and obtained on an accurate machine, working on a rectilinear-system of coordinates for placing the cutter in its series of positions relative to the blank on which it operates.

For example, assume that the axis of the rotary-cutter is fixed, then the blank is capable of two definite movements at right-angles to one another for locating the cutter with great exactitude for producing the required hole through the blank or cut from the edge of the blank, and, then for the next hole or cut, the blank fixedly mounted on the movable or adjustable member of the machine is shifted by adjustment of such member into correct position for the next hole or cut and so on.

This is the method of procedure at present practiced for the making of the chain or succession of overlapping holes or cuts and the exact and precise locations of the cutter with relation to the blank are determined, not necessarily by scales at right-angles to one another on the machine, but by the employment of very accurate rods of different calibrated lengths.

Of course, a machine could be employed for such cutting in which the metal-blank remains stationary and the cutter is adjusted in two directions at right-angles to one another.

The two, second, full-size master-cams 242 and 243, having been made in the manner indicated, it now becomes necessary to make a pair of roll-curve gears 31 and 32 under their control.

Using these two cams, similar gear-blanks are made, the shapes thereof being governed by rollers traveling on the edges of the two cams, but such rollers and the cutters controlled thereby are so related that the gear-blanks have addenda to provide for the gear-teeth to be subsequently cut.

Assume that master-cam 242 is slowly revolved about its axis 244 and that a roller of proper size is held against its cam periphery under great pressure to preclude slipping, and assume that such roller is also mechanically connected to and revolves a rotary gear-tooth cutter, such as is commonly employed in a Fellows gear-cutting machine, acting on the corresponding gear-blank referred to, such gear-tooth cutter cuts the teeth on the blank, the number of teeth and pitch having been determined in accordance with the standard practice in making ordinary spur-gears.

In this case, such master-cam, through its associated roller, revolves the gear-tooth cutter on its axis for the cutting of the teeth, the moving of such cutter in and out toward and from the axis of the gear-blank being also produced by such master-cam through such roller. The moving of the gear-tooth cutter to clear the gear-blank on the return stroke of the cutter is provided as in a Fellows gear-tooth cutting machine.

In this manner, the first driving-gear 31 is made, and, in an analogous way, the initial driven-gear 32 is supplied while the master-cam 243 revolves around its axis 245.

In the cutting of the teeth of subsequent gears on their blanks, the corresponding master-cam 242, in the case of the making of the driving-gear, controls the in-and-out (not return-clearance) travel of the gear-tooth cutter, but, by having the first gear 31 rotate simultaneously about its axis and gearing it to the gear-tooth cutter, a positive rotation of the latter occurs, rather than through the friction-drive employed in making the first gear, and, of course, it will be understood that the subsequent driven-gears will be made in an analogous manner.

Those acquainted with this art will readily understand that the specified objects and aims of the invention are attained by practicing the procedure herein set forth and in the resulting cooperating roll-curve gears produced in this way.

The invention, as defined by the appended claims, is not necessarily limited or restricted to all of the details set forth above and these may be modified or changed more or less without departure from the substance and essence of the invention and without the loss or sacrifice of its several material benefits and advantages.

It will be understood that in some instances, inverted parabolas may be used in the elimination of the speedgraph cusps, but in all cases the parabolas have preferably their axes vertical for the reasons specified above.

The method of making the roll-curve gears disclosed above constitutes the subject-matter of my co-pending patent application, Method of making gears, Serial No. 310,502, filed December 22, 1939.

I claim:

1. A pair of complementary driving and driven gears having roll-curves shaped, when the gears are intermeshed and the driving-gear is rotated about its axis in a predetermined manner, to angularly revolve the driven-gear about its axis, for at least a part of its complete revolution, at a constant rate of change of acceleration, the toothed edge of each gear being free from cusps.

2. The pair of gears set forth in claim 1 in which the stated revolution of the driven-gear is produced when the driving-gear is rotated about its axis at a uniform speed.

3. A pair of complementary driving and driven gears having roll-curves shaped, when the gears are intermeshed and the driving-gear is rotated about its axis in a predetermined manner, to angularly revolve the driven-gear about its axis, for at least a part of its complete revolution, at a constant rate of change of deceleration, the toothed edge of each gear being free from cusps.

4. The pair of gears set forth in claim 3 in which the stated revolution of the driven-gear is produced when the driving-gear is rotated about its axis at a uniform speed.

5. A pair of complementary driving and driven gears having roll-curves shaped, when the gears are intermeshed and the driving gear is rotated about its axis in a predetermined manner, to angularly revolve the driven-gear about its axis, for at least a part of its complete revolution, at a constant rate of change of decrease in acceleration and at a constant rate of change of increase in deceleration, the toothed edge of each gear being free from cusps.

6. The pair of gears set forth in claim 5 in which the stated revolution of the driven-gear is produced when the driving-gear is rotated about its axis at a uniform speed.

7. A pair of complementary driving and driven gears having roll-curves shaped, when the gears are intermeshed and the driving-gear is rotated about its axis in a predetermined manner, to angularly revolve the driven-gear about its axis, for at least a part of its complete revolution, at a constant rate of change of decrease in acceleration, then at a constant speed of revolution, and then at a constant rate of change of increase in deceleration, the toothed edge of each gear being free from cusps.

8. A pair of complementary driving and driven gears having roll-curves shaped, when the gears are intermeshed and the driving-gear is rotated about its axis at a uniform speed, to angularly revolve the driven-gear about its axis, for at least a part of its complete revolution, at a constant rate of change of decrease in acceleration, then at a constant speed of revolution, and then at a constant rate of change of increase in deceleration, the toothed edge of each gear being free from cusps and with all of its teeth in operative register around such edge.

9. A pair of complementary driving and driven gears having roll-curves shaped, when the gears are intermeshed and the driving-gear is rotated about its axis in a predetermined manner, to angularly revolve the driven-gear about its axis, for at least a part of its complete revolution, at a constant acceleration, then at a uniformly-decreasing acceleration, then at a uniform speed of revolution, then at a uniformly-increasing deceleration, and then at a constant deceleration, the toothed edge of each gear being free from cusps and with all of its teeth in operative register around such edge.

10. The pair of gears set forth in claim 9 in which the stated revolution of the driven-gear is produced when the driving-gear is rotated about its axis at a uniform speed.

11. A pair of complementary driving and driven gears having roll-curves shaped, when the gears are intermeshed and the driving-gear is rotated about its axis in a predetermined manner, to angularly revolve the driven-gear about its axis, for at least a part of its complete revolution, at different speeds and at a speed, between said periods of different speeds, corresponding to the progressively-varying area of a zone bordered on at least one side by a portion of a parabola, the toothed edge of each gear being free from cusps.

12. The gears set forth in claim 11 in which the driven-gear has the speed characteristics specified when the driving-gear is rotated about its axis at a uniform speed.

13. The pair of gears set forth in claim 11 in which said zone has two parallel sides, in which the axis of the parabola is parallel to said sides, and in which said area varies progressively in a direction at right-angles to said axis.

14. The pair of gears set forth in claim 11 in which the driven-gear has the speed characteristics specified when the driving-gear is rotated about its axis at a uniform speed, in which said zone has two parallel sides, in which the axis of the parabola is parallel to said sides, and in which said area varies progressively in a direction at right-angles to said axis.

HYMAN E. GOLBER.